(No Model.) 6 Sheets—Sheet 1.

F. H. RICHARDS.
WEIGHING AND BAGGING MACHINE.

No. 589,295. Patented Aug. 31, 1897.

Witnesses:
O. W. Smith
Fred. J. Dole.

Inventor:
F. H. Richards (No Model.) 6 Sheets—Sheet 2.

F. H. RICHARDS.
WEIGHING AND BAGGING MACHINE.

No. 589,295. Patented Aug. 31, 1897.

Witnesses:
O. W. Smith
Fred. J. Dole.

Inventor:
F. H. Richards (No Model.) 6 Sheets—Sheet 3.

F. H. RICHARDS.
WEIGHING AND BAGGING MACHINE.

No. 589,295. Patented Aug. 31, 1897.

Witnesses:
O. W. Smith
Fred. J. Dole.

Inventor:
F. H. Richards.

(No Model.) 6 Sheets—Sheet 4.
F. H. RICHARDS.
WEIGHING AND BAGGING MACHINE.

No. 589,295. Patented Aug. 31, 1897.

Witnesses:
O. W. Smith
Fred. J. Dole.

Inventor:
F. H. Richards (No Model.) 6 Sheets—Sheet 5.

F. H. RICHARDS.
WEIGHING AND BAGGING MACHINE.

No. 589,295. Patented Aug. 31, 1897.

Witnesses:
O. W. Smith
Fred. J. Dole.

Inventor:
F. H. Richards (No Model.)  6 Sheets—Sheet 6.

F. H. RICHARDS.
WEIGHING AND BAGGING MACHINE.

No. 589,295.  Patented Aug. 31, 1897.

Witnesses;
O. W. Smith
Fred. J. Dole.

Inventor;
F. H. Richards.

UNITED STATES PATENT OFFICE.

FRANCIS H. RICHARDS, OF HARTFORD, CONNECTICUT.

WEIGHING AND BAGGING MACHINE.

SPECIFICATION forming part of Letters Patent No. 589,295, dated August 31, 1897.

Application filed April 20, 1897. Serial No. 632,917. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing and Bagging Machines, of which the following is a specification.

This invention relates to weighing and bagging machines, it being in the nature of an improvement upon the invention set forth by Letters Patent No. 572,067, granted to me November 24, 1896, the main object being to provide, in connection with a scale-beam or equivalent device, a support for a load-receiver, said support depending from the scale-beam, an auxiliary load-receiver mounted on the scale-beam, and means for supplying parts of a predetermined charge, respectively, to the two load-receivers, means being preferably provided for removing material from one of said load-receivers during the weighing of a load.

In the form of the invention herein illustrated and described means are provided for sustaining a bag or like device from the scale-beam, said bag constituting the main load-receiver, the other or auxiliary load-receiver consisting, preferably, of a hopper; and to these load-receivers an overload or overcharge is conducted, part of the supply being delivered to the main load-receiver or bag and the remainder being delivered to the auxiliary load-receiver or hopper, and at a certain point in the operation of the machine means are brought into action for removing or withdrawing the surplus or overcharge from the auxiliary load-receiver or hopper, the mass remaining in the two receivers constituting the true load, which load can be suitably discharged.

Figure 1:
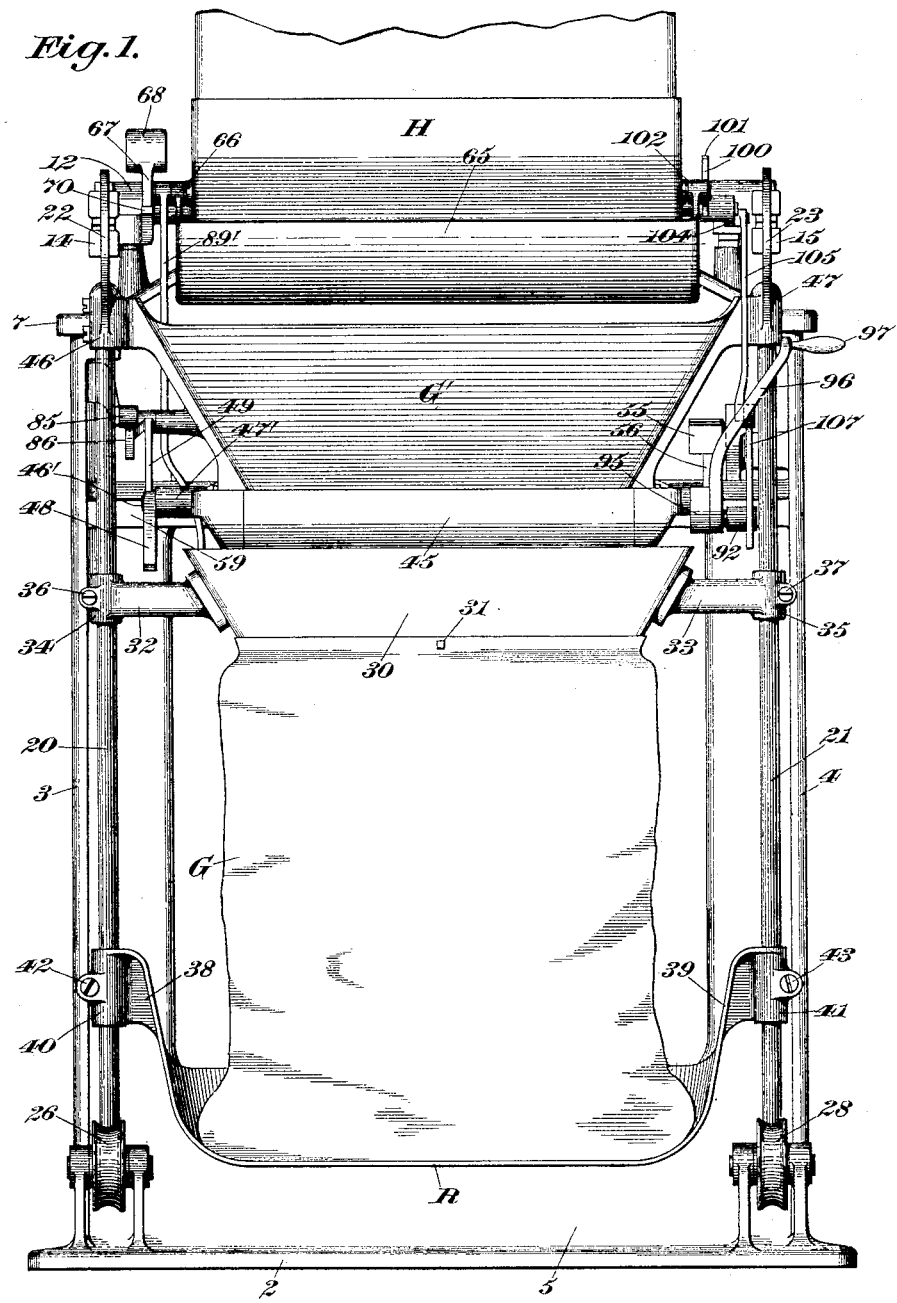
Figure 2:
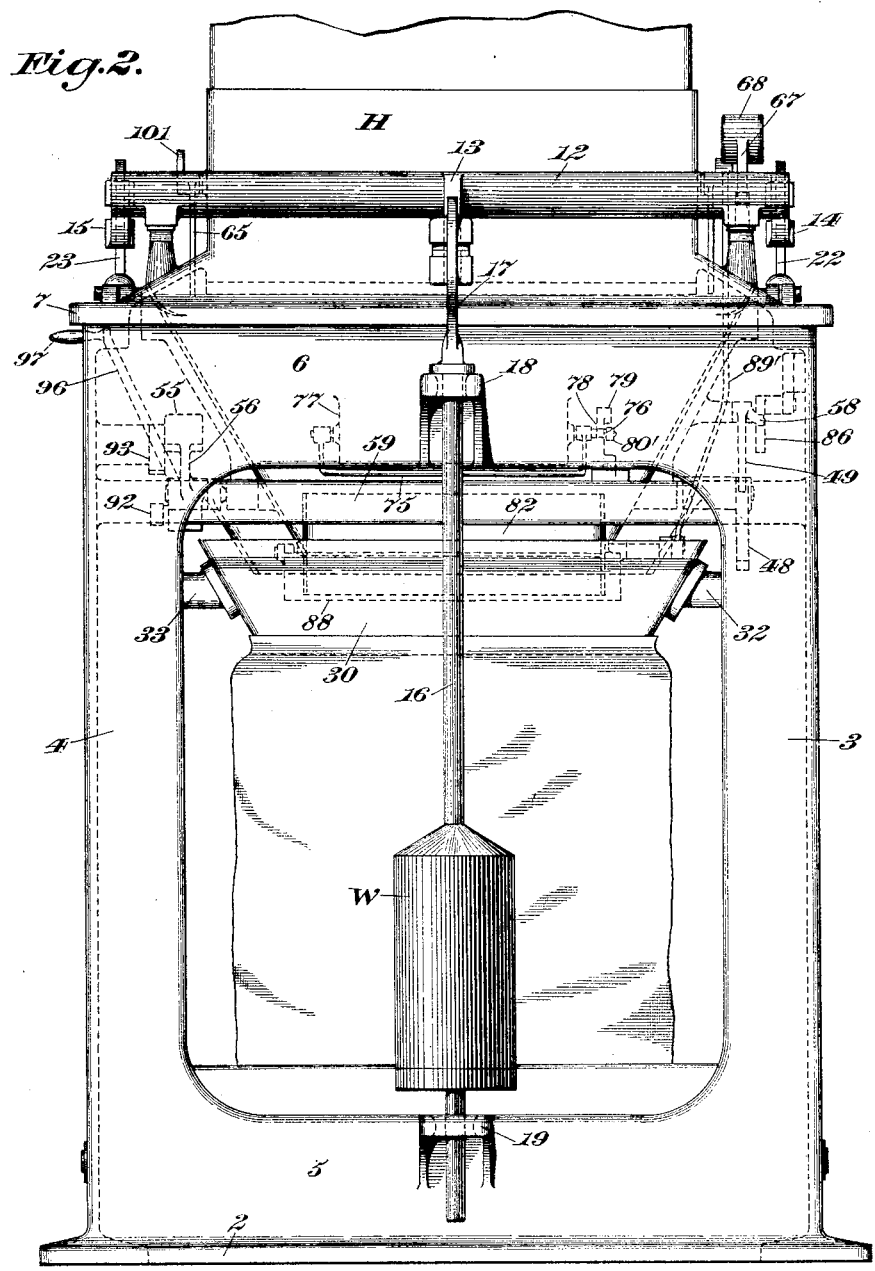
Figure 3:
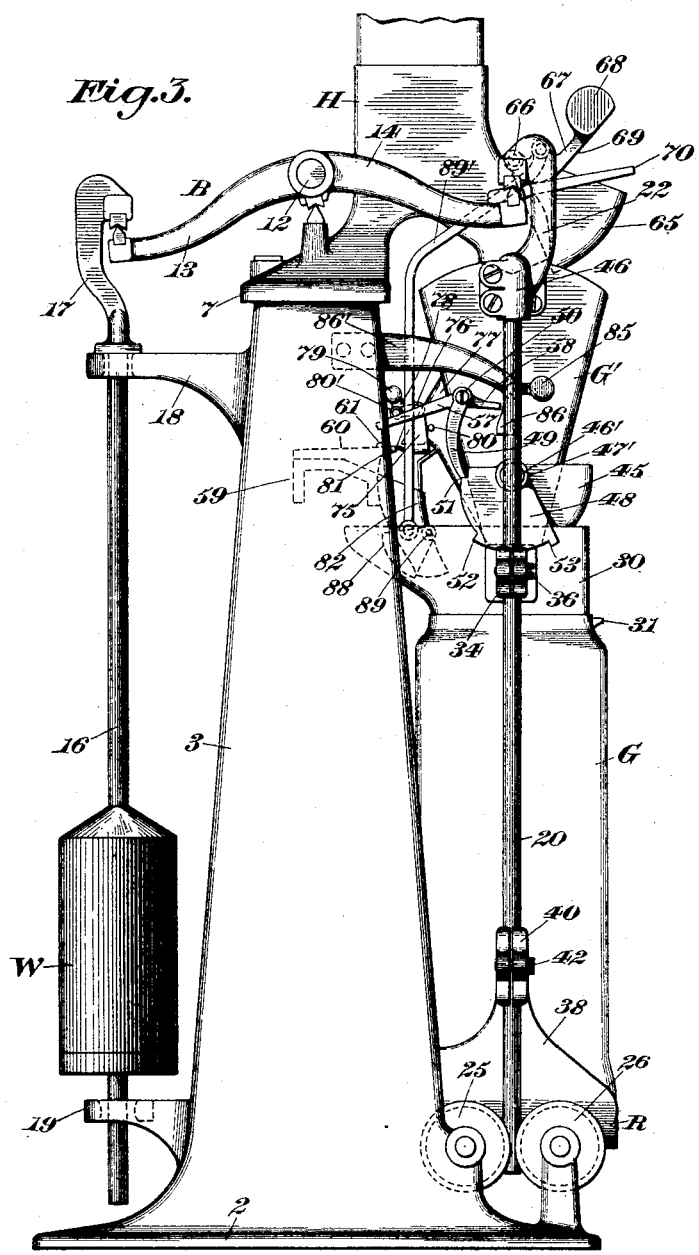
Figure 4:
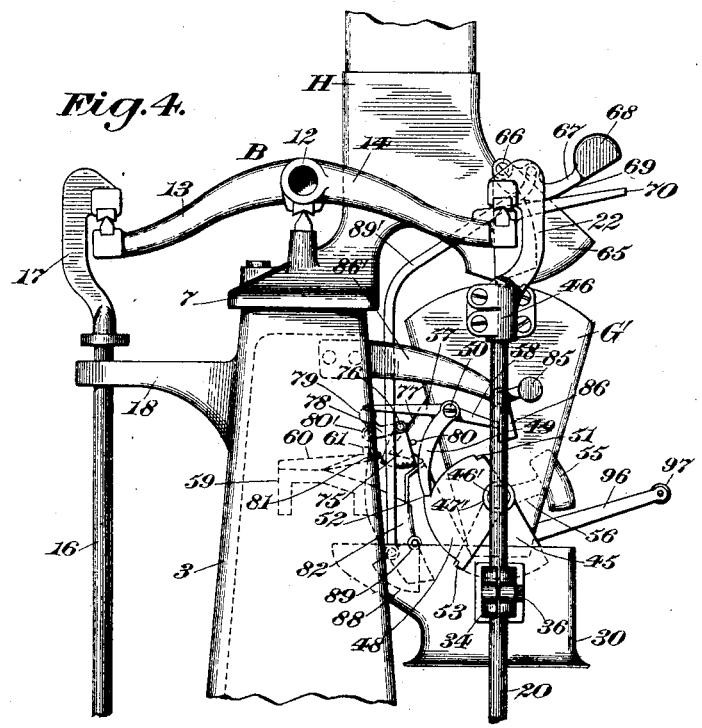
Figure 5:
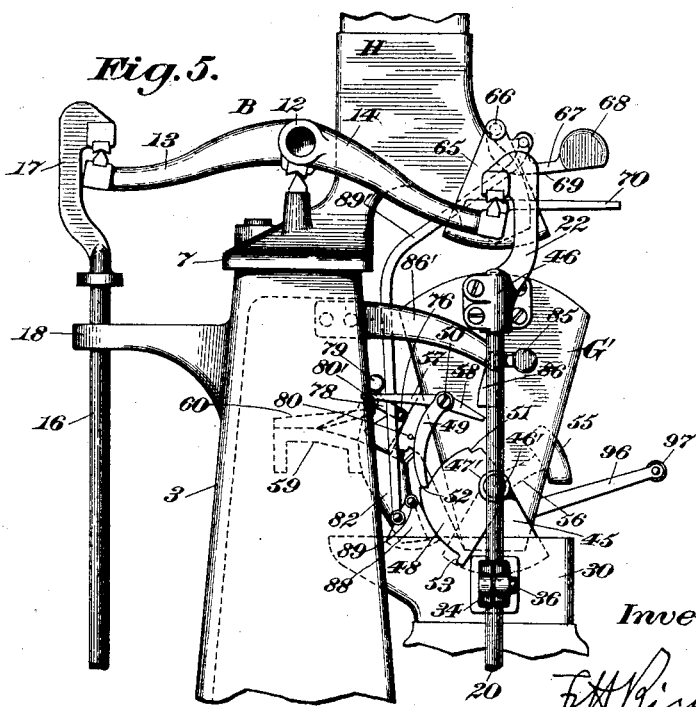
Figure 6:
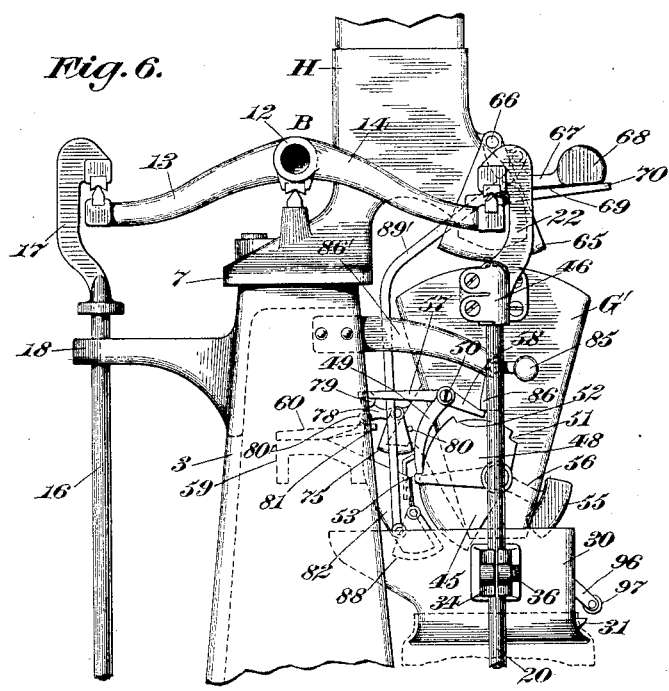
Figure 7:
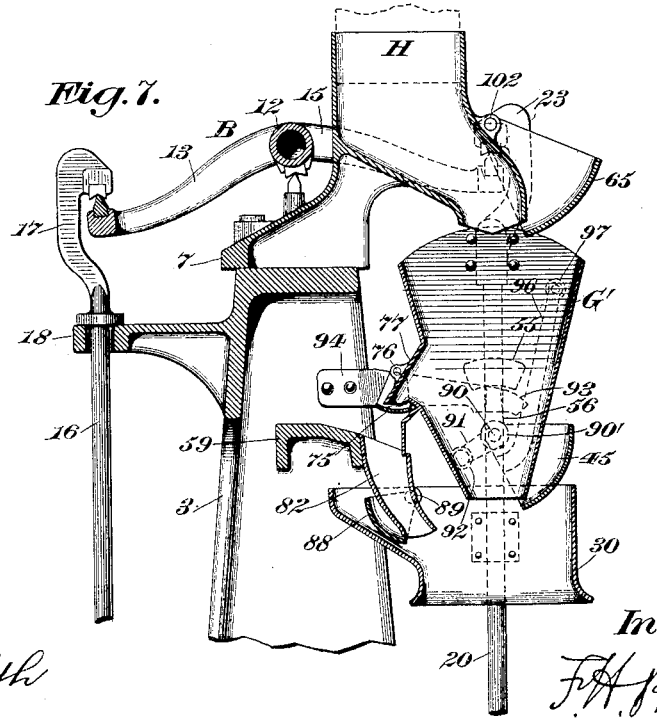
Figure 8:
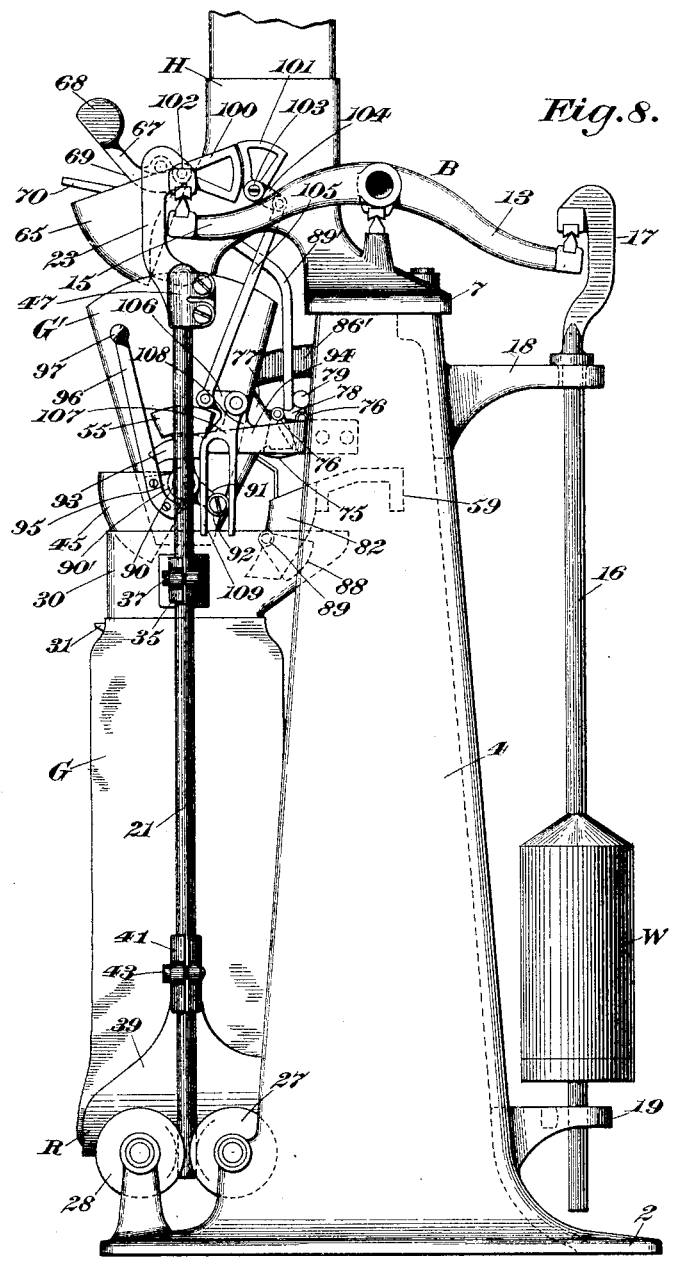

In the drawings accompanying and forming part of this specification, Figure 1 is a front elevation of my improved weighing and bagging machine. Fig. 2 is a rear elevation of the same. Fig. 3 is a side elevation of the machine as seen from the right in Fig. 1, illustrating the positions occupied by the various parts at the commencement of operation. Figs. 4, 5, and 6 are similar views of the upper part of the machine, showing the positions occupied by the parts at three succeeding stages in the operation. Fig. 7 is a longitudinal central section of Fig. 4; and Fig. 8 is a side elevation of the machine as seen from the left in Fig. 1, with the parts in positions corresponding, respectively, with Figs. 1 and 2.

Similar characters designate like parts in all the figures of the drawings.

The framework for sustaining the various operative devices of the machine may be of any suitable character, it consisting in the present instance of the base-plate 2, from which rise the vertical columns 3 and 4, the latter being joined at the bottom and top, respectively, by the integral cross-pieces 5 and 6, the cross-piece 6 being surmounted by the flat plate 7, to which is secured the supply-hopper H.

The scale-beam for supporting the two load-receivers may be of any suitable or preferred construction, it being designated by B and consisting in the present case of the longitudinal shaft 12 and the oppositely-extending arms 13, 14, and 15, respectively, the rearwardly-extending arm 13 preferably supporting the counterweight of the beam and the other two or the oppositely-disposed arms carrying the load-receivers. The shaft 12 has at each end thereof the usual depending notched bearings, which rest upon coöperating pivots or knife edges suitably secured to the top plate 7.

For counterbalancing the two load-receivers and the predetermined charge to be made up therein any suitable weight may be employed, the weight W being represented for this purpose, said weight being suitably secured near the lower end of the hanger or bar 16, said hanger having the hook 17 at its upper end furnished with the usual notched bearing, which is borne by a knife-edge pivot on the outer end of the beam-arm 13. The hanger or rod 16 passes through suitable guide-apertures formed, respectively, in the lugs or brackets 18 and 19 on the framework.

The two load-receivers (to be hereinafter more particularly described) may be suspended in any suitable manner from the scale-beam, the hangers or longitudinal bars 20 and 21 being shown for this purpose, each of said hangers being furnished at its upper end with a suitable hook carrying a V-shaped bearing which rests on a knife-edge pivot on the corresponding beam-arm. The hook for the hanger 20 is designated by 22, while the opposite hook is designated by 23, said hooks being suspended from the two beam-arms 14 and 15, respectively. The two hangers or bars 20 and 21 are preferably guided at their lower ends between and substantially in contact with suitable rollers or wheels, the hanger 20 being reciprocatory between the peripheries of the rollers 25 and 26, and the hanger 21 being likewise movable between the rollers 27 and 28, whereby undue oscillatory movement of said hangers during the operation of the machine is prevented. The several rollers may be mounted for rotation in any suitable or convenient manner.

In my present invention I provide two load-receivers, to which are conducted parts or complements of a predetermined quantity of material, the amount supplied being in excess of or beyond that determined upon for a true load. At a certain time in the operation the surplus will be removed, the mass remaining in the load-receivers constituting the true charge.

The two load-receivers may be of any suitable construction. In the present case they consist, respectively, of the bag G and the valved hopper G', each suspended from the scale-beam B, the auxiliary load-receiver or hopper G' being located above the main load-receiver or bag G. In connection with these load-receivers an overload or overcharge is supplied, the greater part of which is delivered to the main load-receiver or bag G, and the remainder or smaller part of which is supplied to the auxiliary load-receiver or valved hopper G'.

The bag-support is designated by 30, and it is tubular in shape, it being furnished at a suitable point with the hook or spur 31, by which the bag can be secured in place below the mouth of said bag-support, the latter acting as a funnel to direct the material into the bag. The bag-support 30 is preferably secured to the hangers 20 and 21, it being furnished with the lateral projections 32 and 33 at opposite sides, which terminate in the clamps 34 and 35, of ordinary construction, embracing said hangers, by which the bag-support is rendered vertically adjustable, the two clamps being maintained in a set position by the holding-screws 36 and 37, which pass through suitably-formed lugs on the two sections of the clamps. The bag G is preferably sustained by a rest, as R, which consists of a shelf or pan having the lateral extensions 38 and 39, furnished with the clamps 40 and 41, which encircle the hangers 20 and 21, respectively, and which are held in a fixed position by the set-screws 42 and 43, respectively.

The auxiliary load-receiver G' consists, in the present case, of a valved hopper-shaped receptacle having a flared inlet-opening located below the outlet of the supply-hopper H, the valve of said hopper being designated by 45 and being preferably provided at its upper end and at opposite sides thereof with the hubs 46 and 47, respectively, which are secured to the two hangers 20 and 21, said hubs being formed integral with the hooks 22 and 23.

The valve 45 will be preferably maintained in its wide-open position (represented in Fig. 3) for the greater period of the operation of the machine, whereby a stream of material of large volume can pass from the hopper H, through the auxiliary load-receiver G', and into the bag G, to nearly fill the latter, which will cause the poising end of the scale-beam, and consequently the two load-receivers, to descend, and at a predetermined stage in the descent of these parts the valve 45 will close to arrest the passage of the material to the bag, whereby the auxiliary load-receiver G' can be nearly filled, it being understood that the hopper H constitutes a convenient means for overloading the two receivers. At a certain time, or when the overloading or overcharging operation has been completed, load-reducing means will be brought into action for removing the surplus from the auxiliary load-receiver, the mass remaining in the two receivers constituting the true load. When such load has been weighed, the material in the auxiliary load-receiver G' will be emptied into the main load receiver or bag G, and the latter can be removed.

As hereinbefore stated, the valve 45 of the auxiliary load-receiver will be maintained in its wide-open position, suitable means being provided to accomplish this result. The valve 45 is of the "pan" type, it being pivoted, as at 46', near the lower end of the auxiliary load-receiver, and the hub 47' of the valve has affixed thereto the notched stop-plate 48, with which is coöperative a suitable pawl, as 49, the latter being pivoted, as at 50, to the auxiliary load-receiver, said pawl being adapted to engage successively the shoulders 51, 52, and 53 on the stop-plate 48, it being represented in engagement with the shoulder 51, Fig. 3, wherein the valve 45 is illustrated thus held in its wide-open position.

At a certain stage in the descent of the two load-receivers the pawl 49 is tripped and thereby disengaged from the shoulder 51, whereby said valve 45 can close, this operation being effected partially by the weight of said valve, assisted by the closing device or weight 55 on the end of the arm 56, fixed to said valve, as shown in Fig. 8.

The pawl 50 is provided with the oppositely-extending arms 57 and 58, the purpose of which will now be described. The two frame members 3 and 4, near the upper ends thereof, are joined by the transverse beam 59, to the upper side of which is suitably secured the abutment or arm 60, having the teat 61, which is disposed in the path of movement of the arm 57 of said pawl. When the bag G has been nearly filled, the pawl-arm 57 will strike said teat, the pawl 49 thereby being tripped, so that the valve 45 is released and can be closed instantly for cutting off the supply to the bag G, the stop-plate 48 swinging with said valve and having its second notch 52 engaged by the gravity-pawl 49.

Any suitable means may be employed for controlling the supply of material to the two load-receivers, the pan-valve 65 being illustrated for this purpose, said valve being pivoted, as at 66, to the hopper. For the purpose of closing the valve the counterweighted arm 67 is provided, said arm being suitably secured to the pivot or trunnion 66 of the valve and its weight being designated by 68, the under side of the arm 67 being of "cam" formation, as at 69, and being adapted to coöperate with the valve-controlling arm 70, fixed to the beam-arm 14. When the beam-arm 14 is at the limit of its upstroke, the valve-controlling arm 70 will be in contact with the inner end of the cam-face 69, whereby the valve 65 can be held in its wide-open position. As said beam-arm drops the arm 70 will fall away from the counterweighted cam-arm 67, permitting the latter to drop, whereby the valve 65 can be closed to cut off the supply to the load-receivers, this operation being completed when the latter are overloaded or overcharged. On the ascent of the beam-arm 14 the arm 70, by engaging the coöperating valve-arm 67, will force the valve 65 open, as will readily be obvious. After the closure of the valve 45 the poising side of the scale-beam B, together with the two load-receivers suspended therefrom, will descend, the auxiliary load-receiver being nearly filled, the surplus or overcharge being withdrawn from said auxiliary load-receiver.

The load-reducing means may be of any suitable character, it consisting in the present case of a valve reciprocatory across a suitable opening in the auxiliary load-receiver. The load-reducing valve is designated by 75, it being suitably pivoted, as at 76, to the load-reducing spout 77 on the rear side of the load-receiver G', as indicated most clearly in Fig. 7, said valve being furnished with the arm 78, which carries the weight 79, adapted to close the valve, until it bears against the pin or stop 80 on the load-reducing spout. When the auxiliary load-receiver has received the overcharge, the arm 78, or the projection or antifriction-roll 80' thereon, will impinge against the outer end 81 of the abutment-arm 60 on the framework, as shown in Fig. 5, whereby the load-reducing valve 75 will be swung open to permit the surplus to pass from the auxiliary load-receiver through the spout 77, the withdrawn material entering a suitable reservoir, as 82, supported independently of the weighing mechanism, it being suitably fastened to the framework or the transverse beam 59 thereof. As the material enters the auxiliary reservoir 82 the poising end of the beam B will rise, whereby the counterweight 79 can shut the valve 75 to stop the further removal of material from the load-receiver. At a predetermined point in the ascent of the load-receiver the valve-holding pawl 49 will be tripped, whereby the valve 45 can be swung open by the counterweight 55, so that the material within the load-receiver G' can be emptied into the bag G, it being understood that after the removal of the mass from the auxiliary load-receiver the material remaining therein constitutes a part of the predetermined or true charge, the residue being in the bag. The arm 58 of the valve-holding pawl 49 coöperates with a suitable tripper, as the by-pass device 85, the latter being in the form of a counterweighted elbow-lever pivoted to the outer end of the fixed arm 86', suitably fastened to the framework.

At the commencement of operation, as shown in Fig. 3, the arm 58 of the pawl 49 will be above the lower end of the arm 86 of the by-pass and nearly in contact therewith, and as the two load-receivers are supplied with material the arm 58 of the pawl will descend therewith and pass in contact with the arm 86 and thrust it to one side, so that the pawl-arm can reach a point below the by-pass arm, as indicated in Fig. 5, where the various parts are shown at the limits of their downstroke. On the removal of the surplus, as set forth, the various parts will rise and the arm 58 will strike the by-pass 86, whereby the pawl 49 is disengaged from the intermediate shoulder 52 of the stop-plate 48, so that the valve 45 is released, which permits the counterweight 55 to drop for swinging the valve 45 open, the stop-plate 48 moving therewith until the shoulder 53 thereon abuts against the pawl 49, which intercepts its further action. The contents of the auxiliary load-receiver on the opening of said valve drop into the bag G.

The reservoir or hopper 82 that receives the overcharge is preferably provided with a valve, as 88, which is pivoted thereto at 89, said valve being preferably connected with the supply-controlling valve 65, the bent rod 89' being preferably furnished for this purpose, said rod being pivoted to the counter-weighted valve-closing arm 67 and also to the valve 88.

On the closure of the supply-controlling valve 65 the valve 88, by reason of its connection with the first-mentioned valve, will be positively closed, as indicated in Fig. 5, so that when the material is withdrawn from the auxiliary load-receiver G' it can be temporarily retained in the reservoir 82. When the various parts ascend at the proper time, the valve 88, by reason of its connection with the valve 65, is swung open to permit the material from the reservoir 88 to pass into the bag placed on the support 30 to form the first part of a new load.

Means will be provided for locking the auxiliary load-receiver G' and scale-beam B against ascending movement on the removal of the bag G, the valve 65 being thereby maintained in its shut position, and the locking means for this purpose are preferably operative with the valve 45. The projecting pin or trunnion 90 of the valve 45 (see Fig. 8) has secured thereto the rock-arm 91, which is furnished at its free end with a projection or antifriction-roll 92, coöperative with the cam 93 at the outer end of the arm 94, the latter being suitably fixed to the framework.

It will be remembered that the valve 45 has two distinct stages of operation, on the first of which it is intended to cut off the supply from the auxiliary load-receiver G' to the bag G, and on the second of which and subsequent to the removal of the surplus it is designed to again swing open to cause the contents of the auxiliary load-receiver to drop into the bag, and on the final movement of the valve the antifriction-roll 92 will ride in contact with the working face of the cam 93, whereby the auxiliary load-receiver, and consequently the beam, are firmly locked against ascending movement, even though the bag is removed. On the placing of a new bag in position manually-controlled means will be operated for throwing the machine into action. The hub 90' of the arm 91 is furnished with a projection 95, to which is suitably secured the hand-lever 96, having the handle 97 at its free end, which can be grasped by an attendant.

The antifriction-roll 92 being in contact with the working face of the cam 93 the machine will be held out of action, and to start the same the attendant will simply turn the hand-lever 96 to disengage the antifriction-roll from the cam 93, whereupon the several parts are released and can rise.

When the valve 45 reaches its normal position, (represented in Fig. 4,) the pawl 49 will engage the shoulder 52 on the stop-plate 48 to hold the valve against immediate closure.

In connection with the supply-controlling valve and the valve for the auxiliary load-receiver reciprocally-effective stops are provided, each being adapted to block the action of the other, said stops being designated, respectively, by 100 and 101, the first-mentioned being secured to the pivot 102 of the supply-controlling valve 65 and the other being pivotally mounted, as at 103, on the hopper and being furnished with the crank-arm 104, to which is pivoted the link 105, the latter being likewise attached to the angular extension 106 of the bifurcated lever 107, which lever is pivotally mounted on a lug 108 on the bracket 94. The stops 100 and 101 are in the form, preferably, of open segments, and the bifurcation 109 of the lever 107 straddles the antifriction-roll 92, the bifurcation being of such a width that the valve can move from its first to its intermediate position without affecting the said lever.

At the commencement of operation, as indicated in Fig. 8, the stop 101 will be in contact with the coöperating stop 100, whereby the stop 100 will positively block the action of the coöperating stop 101 until the valve 65 is fully closed, at which time the stop 100 will have reached a point above the curved face of the stop 101, thereby releasing the latter, so that as the valve 45 swings from its second position the antifriction-roll 92 by impinging against the inner leg of the bifurcation 109 will swing the lever 107 in a corresponding direction, whereby the stop 101 on such movement is shifted under the coöperating stop 100, as will be readily obvious, to block the retractive movement of said stop.

The operation of the hereinbefore-described machine, briefly stated, is as follows: Figs. 1, 2, 3, and 7 represent the positions occupied by the various parts at the commencement of operation, a bag having been secured to the support 30 and being sustained by the rest R, and the supply-valve 65 and the auxiliary-load-receiver valve 45 both being wide open a stream of material flowing from the hopper H will pass through the auxiliary load-receiver G' and drop into the empty bag G, and when a certain proportion of the load has been received the two load-receivers and the poising side of the beam B will descend and the valve-controlling arm 70 move away from the counterweighted valve-closing arm 67, whereby the counterweight 68 can close the valve 65, as represented in Fig. 6, this operation being completed at the time the two load-receivers have received the overload. At a predetermined point, or when the bag G is nearly full, the arm 57 of the pawl 49 will abut against the teat 61 on the framework, whereby the pawl 49 will be disengaged from the shoulder 51 of the stop-plate 48, and whereby the valve 45 is released and shut by its weight, assisted by the falling weight 55, secured thereto. When the parts have reached the limits of their downstroke, the projection or antifriction-roll 80' of the load-reducing valve 75 will abut against the end 81 of the abutment-arm 60, whereby said valve is swung open to effect the withdrawal of material from the auxiliary load-receiver, which passes therefrom and into the overcharge-reservoir 82, the valve 88 of which is closed, as shown in Fig. 5. As the load-receiver lightens it will rise, and when the load is finished the arm 58 of the pawl will abut against the arm 86 of the by-pass tripper, whereby the pawl 49 is disengaged from the shoulder 52 of the stop-plate 48. When the pawl is tripped, the weight 55 by dropping will swing the valve 45 open to permit the part of the charge in the auxiliary load-receiver G' to enter the bag G. On the final movement of the valve 45 the antifriction-roll 92, which is operative therewith, will engage the working face of the fixed cam 93 to prevent the ascent of the auxiliary load-receiver when the bag is removed.

To start the machine in operation, the handle 96 will be properly turned to disengage the roll 92 from the cam 93, at which time the several parts of the machine will resume their primary positions and the operation will be repeated.

Having described my invention, I claim—

1. The combination, with weighing mechanism including a plurality of receivers, of means for supplying an overload part of which is directed to one receiver; means operative during the weighing of a load for removing the surplus from said last-mentioned receiver; and a reservoir supported independently of the weighing mechanism, for receiving the surplus.

2. The combination, with weighing mechanism including main and auxiliary load-receivers; means for supplying an overload to the several receivers; means operative during the weighing of a load for removing the surplus from the auxiliary load-receiver; and a reservoir supported independently of the weighing mechanism and located to receive the surplus.

3. The combination, with a scale-beam, of means for suspending a bag from the scale-beam; an auxiliary load-receiver also suspended from the scale-beam; means for supplying an overload part of which is delivered to the bag and the remainder to the auxiliary load-receiver; instrumentalities operative during the weighing of a load for removing the surplus from the auxiliary load-receiver; and a reservoir mounted on the framework and located to receive the surplus.

4. The combination, with weighing mechanism including main and auxiliary load-receivers the auxiliary load-receiver having a valve, of means for supplying an overload part of which is delivered to the main load-receiver and the remainder to the auxiliary load-receiver; means operative during the weighing of a load for removing the surplus from the auxiliary load-receiver; and a reservoir supported independently of the weighing mechanism, for receiving the surplus.

5. The combination, with weighing mechanism including main and auxiliary load-receivers, of a load-reducing valve mounted on the auxiliary load-receiver; means for supplying an overload part of which is delivered to the main load-receiver and the remainder to the auxiliary load-receiver; means operative during the weighing of a load for actuating the load-reducing valve to effect the removal of the surplus from the auxiliary load-receiver; and a reservoir supported independently of the weighing mechanism, for receiving the surplus.

6. The combination, with weighing mechanism including main and auxiliary load-receivers; a load-reducing valve carried by the auxiliary load-receiver and provided with an arm; means for supplying an overload part of which is delivered to the main load-receiver and the remainder to the auxiliary load-receiver; and an abutment on the framework, disposed in the path of movement of and adapted to be engaged by said arm thereby to open the valve, whereby the removal of the surplus from the auxiliary load-receiver will be caused.

7. The combination, with weighing mechanism including main and auxiliary load-receivers, of a load-reducing valve mounted on the auxiliary load-receiver and provided with a counterweighted arm; means for supplying an overload part of which is delivered to the main load-receiver and the remainder to the auxiliary load-receiver; an abutment on the framework, disposed in the path of movement of and adapted to be engaged by said counterweighted arm thereby to open the valve, whereby the removal of the surplus from the auxiliary load-receiver will be caused; and a reservoir supported independently of the weighing mechanism to receive the surplus.

8. The combination, with weighing mechanism including main and auxiliary load-receivers, of means for supplying an overload part of which is delivered to the main load-receiver and the remainder to the auxiliary load-receiver; a device carried by the auxiliary load-receiver for effecting the removal of the surplus therefrom; and a reservoir supported by the framework, to receive the surplus.

9. The combination, with main and auxiliary load-receivers, of a hopper located to deliver a stream of material to the auxiliary load-receiver; a valve for said hopper; a counterweighted arm connected with the valve for closing the same, said arm having a cam-face; a valve-controlling arm coöperative with the weighing mechanism and adapted to engage said cam-face; means on the auxiliary load-receiver for effecting the removal of material therefrom before the completion of the load; and a reservoir carried by the framework and in position to receive the material thus removed.

10. The combination, with a scale-beam; of a support for a bag, carried by the scale-beam; an auxiliary load-receiver mounted on the scale-beam and having a valve for regulating the discharge of material therefrom; means for supplying an overload part of which is delivered to the auxiliary load-receiver and by the latter directed into the bag; means for closing said valve when the bag has received a predetermined quantity; instrumentalities adapted to remove material from the auxiliary load-receiver when the valve is closed; and a reservoir supported by the framework and in position to receive material thus removed.

11. The combination, with a scale-beam; of a support for a bag, suspended from the scale-beam; an auxiliary load-receiver mounted on the scale-beam and having a valve for regulating the discharge of material therefrom; means for supplying an overload part of which is delivered to the bag when the valve is open; instrumentalities for holding the valve open for a predetermined length of time and for also closing the same; means for removing material from the auxiliary load-receiver when the valve is closed; and a reservoir in position to receive the material thus removed.

12. The combination, with a scale-beam; of a support for a bag, suspended therefrom; an auxiliary load-receiver mounted on the scale-beam and having a valve for regulating the discharge of material therefrom; means for supplying an overload part of which is delivered to the bag and the remainder to the auxiliary load-receiver when the valve is closed; means for holding the valve open for a predetermined length of time; instrumentalities operative to first close and then open said valve; means for removing the surplus from the auxiliary load-receiver when the valve is closed; and a reservoir in position to receive the surplus.

13. The combination, with a scale-beam; of a support for a bag, carried by the scale-beam; an auxiliary load-receiver mounted on the scale-beam and having a valve for regulating the discharge of material therefrom; stream-supplying means for the auxiliary load-receiver; a stop-plate connected with said valve; a pawl for engaging said stop-plate; means for tripping the pawl whereby the valve can be closed; and instrumentalities adapted, when said valve is closed, to remove material from the auxiliary load-receiver.

14. The combination, with a scale-beam; of a support for a bag, carried by the scale-beam; an auxiliary load-receiver mounted on the scale-beam and having a valve for regulating the discharge of material therefrom; stream-supplying means for the auxiliary load-receiver; valve-actuating means; a stop-plate connected with said valve and having a series of shoulders; a pawl mounted on the load-receiver and adapted successively to engage said shoulders; means for successively tripping said pawl whereby the valve can be closed and again opened by its actuating means; and instrumentalities for removing material from the auxiliary load-receiver when said valve is closed.

15. The combination, with a scale-beam; of a support for a bag, carried by the scale-beam; an auxiliary load-receiver mounted on the scale-beam and having a valve for regulating the discharge of material therefrom; stream-supplying means for the auxiliary load-receiver; a shouldered stop-plate connected to said valve; valve-actuating means; a pawl mounted on the auxiliary load-receiver and having oppositely-disposed arms; means for successively engaging said arms, thereby to trip the pawl, whereby the valve can be closed and successively opened; and instrumentalities operative, when said valve is closed, for removing material from the auxiliary load-receiver.

16. The combination, with a scale-beam; of a support for a bag, carried by the scale-beam; an auxiliary load-receiver mounted on the scale-beam and having a valve for regulating the discharge of material therefrom; stream-supplying means for the auxiliary load-receiver; a stop-plate connected to said valve and provided with a series of shoulders; a pawl mounted on the load-receiver and having oppositely-disposed arms; devices mounted on the framework, for successively engaging said arms, thereby to trip the pawl, whereby the valve can be closed; a load-reducing valve carried by the auxiliary load-receiver; and means on the framework, for opening said valve when the first-mentioned valve is closed, whereby material can be withdrawn from the auxiliary load-receiver.

17. The combination, with weighing mechanism including main and auxiliary load-receivers, of means for supplying an overload to the respective receivers; means in position to remove the surplus from one of said receivers during the weighing of a load; and a reservoir mounted independently of the weighing mechanism and located to receive the surplus.

18. The combination, with a scale-beam, of main and auxiliary load-receivers suspended therefrom; means operative, during the weighing of a load, for removing material from one of said load-receivers; a valved reservoir mounted to receive material withdrawn from said load-receiver; a supply-hopper; and a valve for said supply-hopper, connected with the valve of said reservoir.

19. The combination, with a scale-beam, of hangers suspended therefrom; rollers mounted on the framework, between which said hangers are adapted to reciprocate; a bag-support; a bag-rest secured, respectively, to said hangers; an auxiliary load-receiver also secured to said hangers; a load-reducing valve carried by the auxiliary load-receiver; and means operative, during the weighing of a load, for actuating the auxiliary valve to effect the removal of material from the auxiliary load-receiver.

20. The combination, with a scale-beam; of a support for a bag, suspended from the scale-beam; an auxiliary load-receiver mounted on the scale-beam and having a valve for regulating the discharge of material therefrom; stream-supplying means for said auxiliary load-receiver; means for removing material from the latter during the weighing of a load; and instrumentalities coöperative with said valve, for locking the auxiliary load-receiver against ascending movement.

21. The combination, with a scale-beam; of a support for a bag suspended from the scale-beam; an auxiliary load-receiver mounted on the scale-beam and having a valve for regulating the discharge of material therefrom; stream-supplying means for said auxiliary load-receiver; means for removing material from the latter during the weighing of a load; instrumentalities coöperative with said valve, for locking the auxiliary load-receiver against ascending movement; and hand-operated means for throwing the machine into action.

22. The combination, with a scale-beam, of main and auxiliary load-receivers suspended therefrom; a valve controlling the discharge of material from the auxiliary load-receiver; means for closing said valve; instrumentalities for removing material from the auxiliary load-receiver when the valve is closed; stream-supplying means for the auxiliary load-receiver, including a valve; and reciprocally-effective stops coöperative, respectively, with said valves.

23. The combination, with a scale-beam; of a support for a bag, suspended from the scale-beam; an auxiliary load-receiver mounted on the scale-beam and provided with a valve for regulating the discharge of material therefrom; means for removing material from the auxiliary load-receiver during the weighing of a load; a hopper provided with a valve; a stop connected with said last-mentioned valve; an arm secured to the valve on the auxiliary load-receiver and provided with a projection; a bifurcated lever, the bifurcation of which is adapted to straddle said projection; and a stop connected with said bifurcated lever and located to coöperate with the first-mentioned stop.

24. The combination, with a scale-beam; of a support for a bag, carried by the scale-beam; an auxiliary load-receiver mounted on the scale-beam and provided with a valve having an arm provided with a projection; a cam mounted on the framework and adapted to be engaged by said projection at a predetermined point; means for closing said valve; instrumentalities for removing material from the auxiliary load-receiver during the weighing of a load; a supply-hopper having a valve; a stop connected with the valve of said hopper; a coöperating stop; a bifurcated lever, the bifurcation of which is adapted to straddle said projection; and a link connected, respectively, to said last-mentioned stop and with the bifurcated lever.

FRANCIS H. RICHARDS.

Witnesses:
   F. N. CHASE,
   ANDREW FERGUSON.